May 18, 1937.  H. L. KRAEFT  2,080,922
JUVENILE VEHICLE AND BODY CONSTRUCTION
Filed March 2, 1935  3 Sheets-Sheet 1
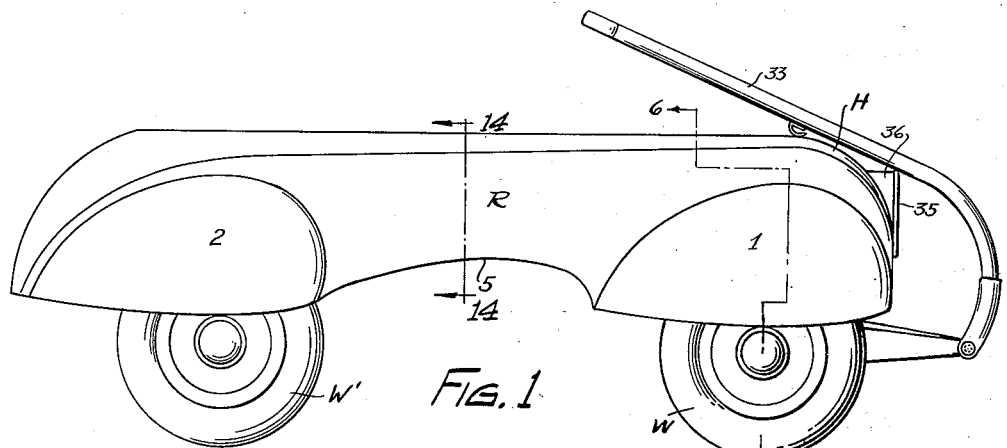
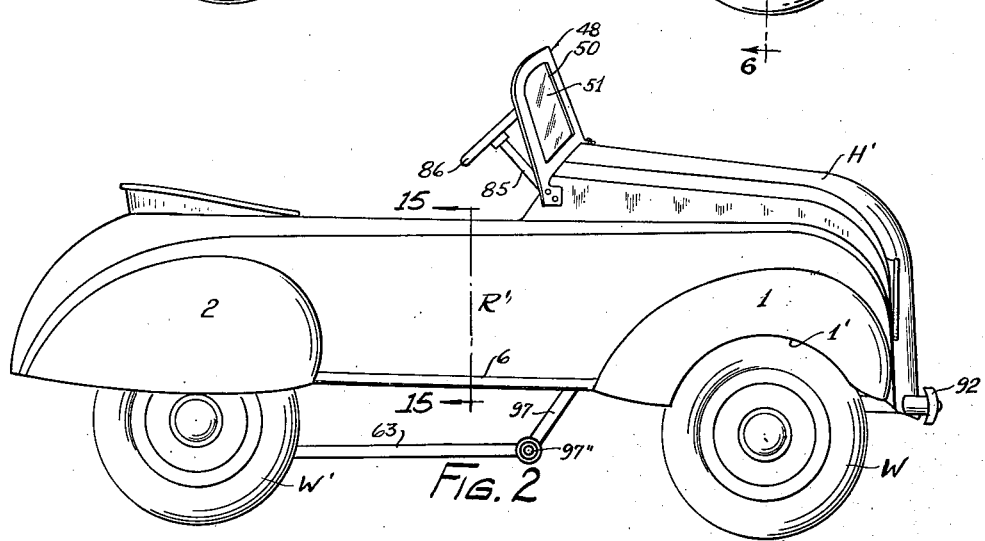
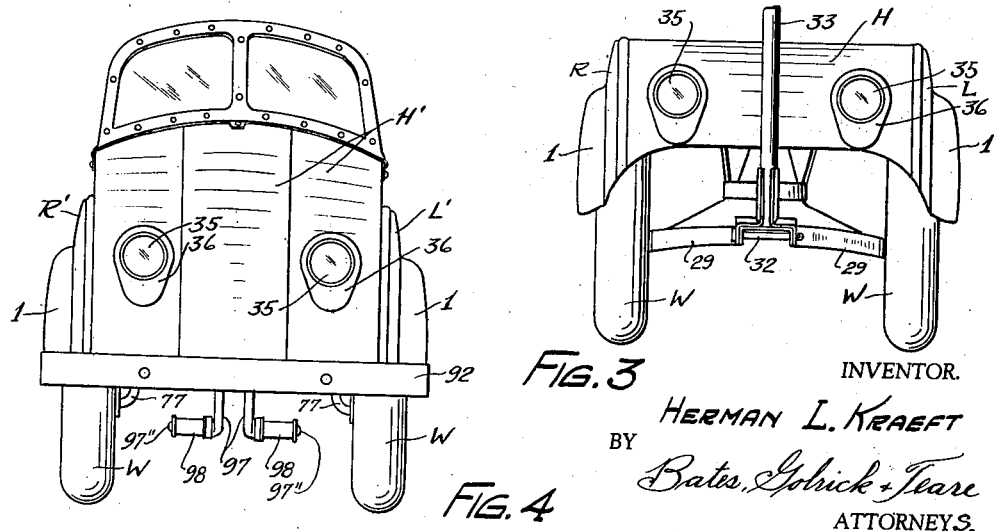
INVENTOR.
HERMAN L. KRAEFT
BY Bates, Goldrick & Teare
ATTORNEYS.

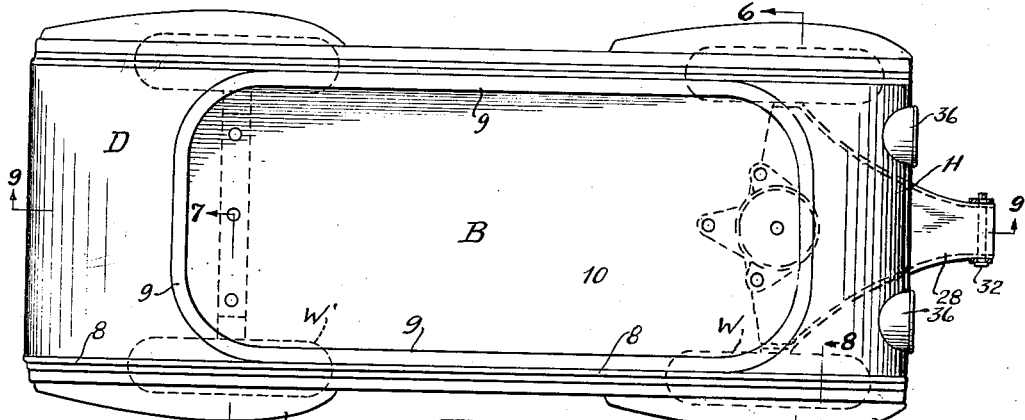

May 18, 1937. H. L. KRAEFT 2,080,922
JUVENILE VEHICLE AND BODY CONSTRUCTION
Filed March 2, 1935 3 Sheets-Sheet 3

INVENTOR.
HERMAN L. KRAEFT
BY Bates, Golrick & Teare
ATTORNEYS

Patented May 18, 1937

2,080,922

UNITED STATES PATENT OFFICE 2,080,922

JUVENILE VEHICLE AND BODY CONSTRUCTION

Herman L. Kraeft, Cleveland, Ohio, assignor to The Murray-Ohio Manufacturing Co., Cleveland, Ohio, a corporation of Ohio Application March 2, 1935, Serial No. 9,001

5 Claims. (Cl. 280—87.5)

This invention relates to a construction for a child's vehicle and particularly to the class embracing coaster or express wagons and pedal-driven toy vehicles resembling automobiles, trucks, coaches and the like. The primary object is to provide a body construction which shall be relatively inexpensive to produce in quantity and in different styles.

A further object is to provide a sheet metal body for coaster wagons, automobile type pedal-driven vehicles and the like, which shall be capable of being sturdily built from light sheet metal without requiring special sills, such as structural angles, etc., usually provided for reinforcement in taking vertical as well as lateral strains.

Still another object is to provide an improved juvenile vehicle body which may be made substantially entirely from simple light gauge sheet metal forms, so arranged with respect to each other that the normal downward forces in supporting the weight say of a child's body are absorbed by the sheet metal structure without likelihood of sagging or bending.

A specific object is to provide a sheet metal juvenile vehicle body of the class herein shown, the larger and more expensive parts of which are usable in different types or styles of bodies, although capable of being made with one set of dies.

Still another object is to provide an improved spring suspension for an axle in a juvenile vehicle of the type shown.

A further object is to simplify the provision and mounting of under carriage parts of a pedal driven juvenile vehicle, particularly the steering mechanism, pedal drive mechanism, etc.

Other objects and features of the invention will become apparent from the following description relating to the accompanying drawings, showing the preferred form. The essential characteristics are summarized in the claims.

Figure 10:
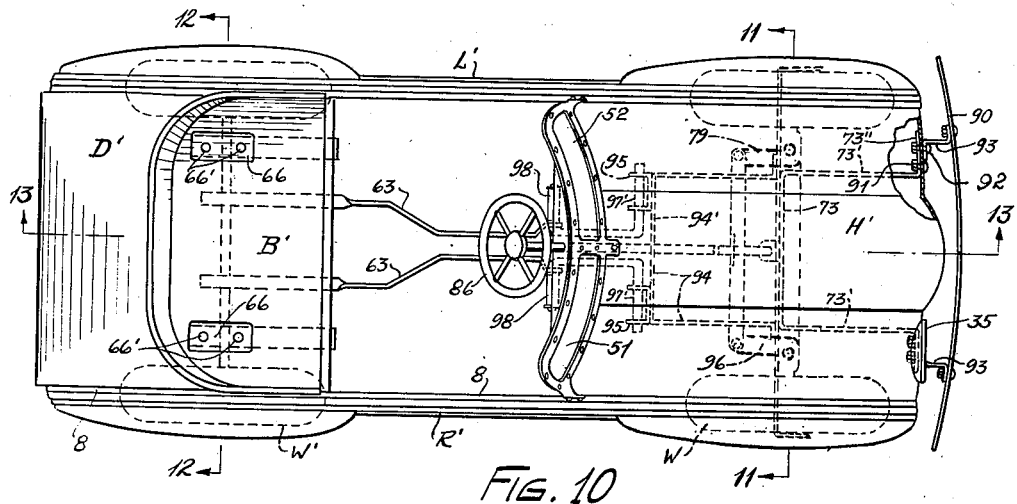
Figures 11, 12:
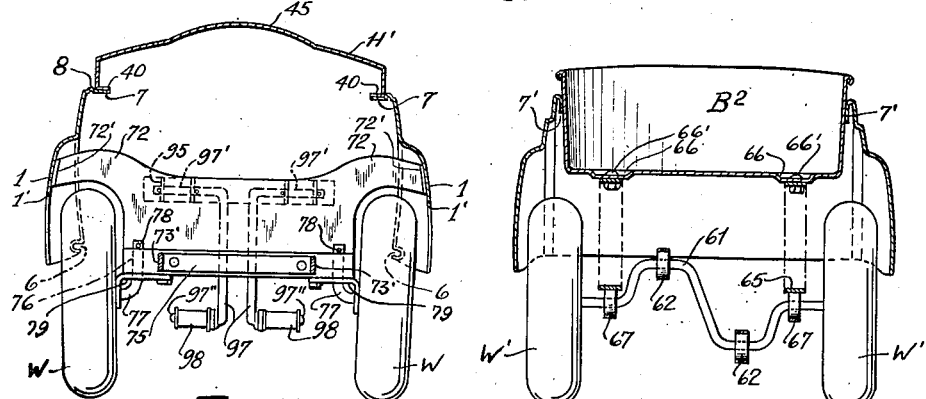
Figure 13:
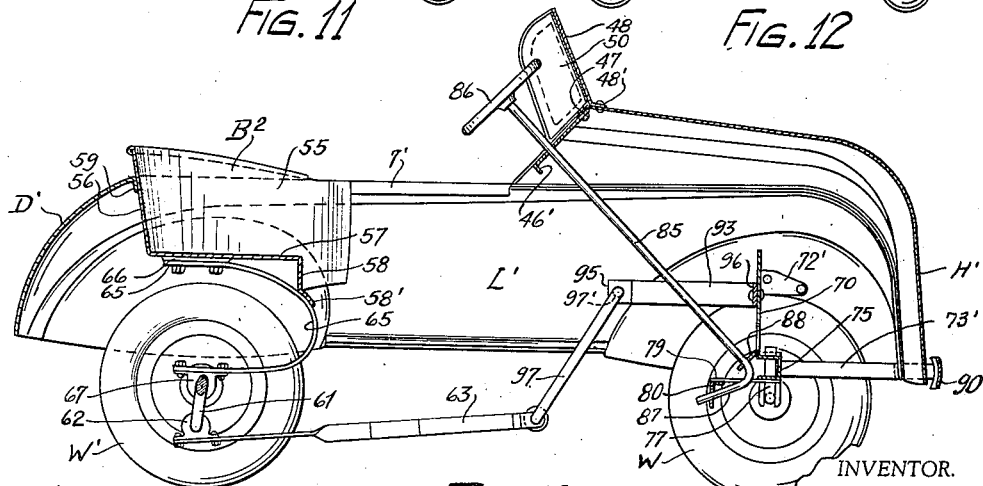

Referring briefly to the drawings, Figs. 1 and 2 are side elevations of different styles of juvenile vehicles embodying the invention; Figs. 3 and 4 are front elevations of the vehicles shown respectively in Figs. 1 and 2; Fig. 5 is a substantially complete plan view of the vehicle shown in Fig. 1; Figs. 6, 7 and 8 are transverse sectional views (7 and 8 being fragmentary) as indicated by the lines 6—6, 7—7 and 8—8 on Fig. 5; Fig. 9 is a longitudinal central sectional view taken in a plane substantially as indicated at 9—9 in Fig. 5; Fig. 10 is a plan view of the vehicle shown in Fig. 2; Figs. 11 and 12 are transverse sectional views taken as indicated on Fig. 10; Fig. 13 is a central longitudinal sectional view taken as indicated by the line 13—13 on Fig. 10, and Figs. 14 and 15 are transverse sectional views taken as indicated by the lines 14—14 and 15—15 on Figs. 1 and 2, respectively.

Referring first to the body arrangement, this comprises principally side members R and L, (or R' and L'); front and rear panels or decks H and D (or H' and D') and load receptacles B (or B'). In the various figures, the side members R and R', for example, are different only in that they are especially trimmed e. g. to better represent the corresponding part of different full-sized vehicles. The essential construction is the same and the parts are made on the same forming dies.

The rear closure members or deck panels D and D' are likewise made on the same forming die and the differences relate only to the form of flanges thereon, as will later be shown.

The front panel member H of Figs. 1 and 5 forms merely a forward deck for the coaster wagon, while the member H' is more elaborately formed to represent or simulate the hood and cowl of an automobile.

The load supporting receptacles B and B' are of considerably different shape, on account of the vehicle types represented, but the principles of construction are the same in a broad sense. The side members R and L only will be described in detail and the differences between R and R', for example, noted.

The side members R and L are convex sheet metal members, having wheel guard or fender portions I and 2 overhanging and lying outwardly from both the front and rear wheels W and W' respectively to shroud at least the upper portions of the respective wheels. The fenders are formed integrally with the side members and are similarly convex (both horizontally and vertically in case of the fenders) so that the entire side panel on each side forms a rigid beam and is in operative effect the body sill.

The transverse convexity of the side members intermediately of the fenders or wheel shrouding portions may be as indicated at 3 in Fig. 6.

As shown in Fig. 2, at I', the front fender effect may be cut away as by a trimming die, this being advisable in case of using steering knuckle type front wheel supports for dirigibility.

The lower edges of the side members may be variously treated in accordance with the body type represented. For example, in Fig. 1 the lower margin of the body side member R, between the fender effects, is cut away as at 5 along a suitably curved line, principally to improve the appearance by reducing severity to some extent in the case of more simple body forms. In the case of representing an automobile body, (Fig. 2 for example) the lower edges of the side members R' and L', intermediately of the fender effects, may be suitably beaded or otherwise configured as at 6 to represent a running board. The cross-sectional character of the bead is indicated in full lines in Fig. 15 and by dotted lines in Fig. 11. The side members may all be formed with the bead effect and subsequently trimmed if an appearance such as that of Fig. 1 e. g. is desired. The cross-sectional shape of the intermediate portions of the side members, according to Fig. 1, is shown in Fig. 14 in full lines and by dotted lines in Fig. 6.

The side members are spaced and tied together through the intermediacy of the front and rear panels or deck members H and D (or H' and D') and in each case the upper longitudinal edges of the side panels are flanged inwardly in the same manner as illustrated at 7 in Figs. 6 and 7; and both the front and rear panel members overlie the flanges 7 in face to face relationship therewith so as to be readily secured thereto as by spot welding. Preferably the flanges 7 have ribs 8 (see Figs. 6 to 8) forming abutments and guards for the side edges of the respective front and rear panels, the ribs running from end to end of the body as shown in both Figs. 5 and 10. The specific character of the hood H' will be later discussed.

The side and end panel assembly or unit formed, as shown, by the members R, L, H and D, e. g. forms an inverted box with an incomplete "bottom" (literally the top) but which, due in large measure to the configuration of surfaces described, has substantially the rigidity of a complete box entirely open at one side (lowermost e. g.) and made from the same material.

Where die expense is not a controlling factor, the unit R, L, H, D, e. g. may be made from one piece of sheet metal in one or more forming operations. The illustrated arrangement is less expensive and stronger by reason of the reinforcing effect of the flanges and beads.

Referring specifically to Figs. 5 to 9, (the coaster wagon style) this has the box B set into the central opening of the outer body unit, a continuous flange 9 of the box B overlying the longitudinal flanges 7 and resting thereon, as well as overlying the rear and front marginal portions of the panel or deck members H and D, respectively. The box, as shown in Figs. 5 and 9, has a bottom wall 10, side walls 11, front and rear walls 12 and 13 and the continuous outstruck flange 9 above mentioned. The box B is preferably formed of one piece of sheet metal in one or more operations, depending largely on the desired depth which may vary considerably in different styles. The side portions of the flange 9 overlie the inwardly turned flanges 7 of the side members as shown in Fig. 6, the edges of the flange substantially abutting the longitudinal bead 8, and the flange may be spot or line welded to all the underlying members above mentioned, including the deck members H and D, or if detachability of the box is desired, the mutually overlying parts may be secured by removable fasteners, for instance, bolts. The double box construction of the body, viz: an upright open box set into the partially open "bottom" of an inverted box, insures unusual strength and rigidity notwithstanding the use of very light gauge metal.

Referring to the under carriage of the Fig. 5 arrangement, it will be noted that the rear axle 20, shown as a section of plain shafting, is mounted on an inverted U-shaped bracket 22 having its central portion 23 underlying the bottom 10 of the box transversely thereof, being secured thereto as by rivets, and having downwardly extending arms 24 suitably apertured to receive the axle. Preferably, the lower end portions of the arms 24 are bent at right angles, as shown at 24' (Fig. 6) to amplify the vertical bearing of the bracket on the axle.

The front axle support (see Figs. 3, 5 and 9) comprises a fifth wheel assembly, including a sheet metal spider bracket having a central circular cup portion 25 and laterally extending arms 26 secured beneath the bottom of the box as by suitable rivets and a rearwardly extending arm 27 similarly secured to the box. The cupped member 25 is one fifth wheel element and the complementary element comprises a triangular sheet metal stamping 28 having down-turned side flanges 29, the rear portions of which are apertured to receive the axle 30. Centrally of the stamping the same lies in face to face contact with the bottom surface of the cup 25 and a pivot bolt is provided at 31 completing the fifth wheel. The forward ends of the stamping flanges 29 are apertured to receive an attaching pin 32 for a suitable tongue 33.

Where such fifth wheel arrangement for steering the vehicle is used, the front wheels may be closely shrouded and more completely guarded by the fender effects 1, as shown in Fig. 1, since the wheels when swung to steer the vehicle are moved inwardly toward the vehicle axis. The fender effect in such case is somewhat stronger and may, if desired, extend far enough down to completely cover the hub portions of the wheels (not illustrated), as may likewise, of course, the rear fenders.

Suitable representations of head lights or actual head light assemblies, if desired, may be provided as at 35, Figs. 1 and 3 in the hood or deck member H. Preferably these comprise centrally apertured bosses 36, pressed out of the sheet metal, the apertures supporting suitable lenses or lens effects. Electric lights and batteries may, of course, be mounted inwardly from the boss effects. The same headlight arrangement may be provided on the hood member H' of the auto type body.

Referring now to the arrangements of Figs. 10 to 13, it will be noted first that the hood forming panel H' lies over a larger portion of the body and is considerably raised as at 45, with respect thereto. This is principally for appearance, the panel representing the usual hood and cowl portions of an automobile body. The raised rear portion of the panel also provides a support for the upper end of a steering shaft or column, and for a windshield structure, to be hereinafter described. The member H' is secured to the flanges 7, as shown in Fig. 11, wherein it may be noted that the hood has inturned side flanges 40 overlying the flanges 7 and that the hood projects sufficiently above the flanges 40 so as to provide an open space thereabove to facilitate welding from the inside of the body.

The rear open portion of the member H' is partially closed by a plate 46 simulating an instrument panel, secured at its upper edge by a downwardly inclined flange 47 on the panel H'. The plate 46 acts as a reinforce and has a transverse flange at 46' running entirely along its free edge. For decorative purposes a "windshield" frame 48 may be supported at the rear portion of the panel H', as by a flange 48'. The frame 48 has a suitable transparent membrane thereon at 50.

The box B' in the case of the auto type body is in the general form of a conventional auto seat. This has side walls 55, a back wall 56, integral with the side wall, and an integral bottom wall 57 having a depending cross flange 58 extending entirely across its front edge. The flange 58 forms a reinforce for the bottom wall of the seat and an apron partially concealing the rearward running gear. The side walls are secured to downwardly bent portions 7' of the flanges 7 (Fig. 12) as by spot welding and the rear wall 56 is similarly secured to a flange 59 (Fig. 13) of the rear deck or panel D'. It will be observed that the box construction is essentially similar to that of the wagon, but differently adapted, principally by omitting the front wall to form a conventional seat.

Referring to the rear axle suspension, Figs. 12 and 13, the rear axle may comprise a suitable round bar of metal bent into a double crank formation 61, housings 62 for attaching pedal links 63 being mounted on the cranks in suitable fashion. The housings preferably contain antifriction bearing assemblies through which the crank portions of the axle pass.

The rear axle is supported directly from the springs which, as shown, are semi-elliptic leaves 65 of appropriate gauge spring stock, the upper portions of the leaves being secured as by suitable fasteners 66' to pad effects 66 at the bottom of the seat. The springs extend forwardly from the anchorage, underlying the apron flange at 58' (abutting the same, if desired), and then curve rearwardly, and the ends overlie the axle. The end portions of the spring members may be secured to the axle by antifriction bearing housing arrangements 67, such as used for attaching the pedal links. Enough looseness may be provided in the axle attachment assemblies, particularly 67, so that the normal canting of the axle will not cause the axle to bind in the bearing assemblies; or ball joint housing and bearing assemblies (not shown) may be used.

Referring now to the front running gear, the wheel supports, steering gear and pedal drive apparatus are all carried on a cross-plate 70, the shape of which is shown best in Figs. 11 and 13. The plate 70 has upwardly and laterally extending curved arms 72 passing around and over the front wheels, with suitable steering clearance, and into the confines of the forward wheel shrouding fender effects 1, the ends of the arms being bent as at 72' to form attaching flanges secured as by bolts to the inside surfaces of the fenders. The plate is preferably detachably secured to the body sides, as well as to the forwardly depending portion of the hood, as will be presently shown.

Because of the peculiar section of the fenders (convex both horizontally and vertically on short arcs or curves) these comprise very strong portions of the side members, wherefore the mutual support between the sides and plate 70 is very strong and rugged. The plate is preferably of a somewhat heavier gauge metal than that forming the side members and hood of the body, on account of the mechanism to be supported by the plate.

At the bottom of the plate 70 is a channel shaped formation 75, forming the front axle beam integral with the main body of the plate as shown. A bracket 73, see Figs. 10 and 13, having parallel arms 73', extending forwardly from the web of the channel,—the arms having laterally bent ends 73'' engaging the inner surfaces of the hood H'—forms a rigid strut connecting the lower portion of the plate 70 to the transversely extending lower part of the hood. The plate, by reason of its construction and manner of attachment to the body as above described greatly reinforces the entire forward portion of the body.

The spaced horizontal flanges provided by the formation 75 of the plate 70 support, in suitable openings, the steering knuckles 77 for the wheels. These, as shown in Fig. 11, are bent shaft sections, the outer ends of which carry the wheels and the inner ends of which extend upwardly through the aligned openings in the channel flanges above which they may be secured as by pins 78. Angle members 79, forming abutment plates for the wheels and lower flange surfaces of the axle beam, are rigidly secured to the knuckles as by welding, and steering arm portions of the angle members project rearwardly from the knuckles and are connected to each other by a suitable tie bar 80.

The steering arrangement further comprises a steering post or shaft 85, having an upper bearing in the instrument panel 46, previously described, the post being surmounted by a suitable wheel 86. The lower end of the shaft is bent to form a steering arm 87, lying between the beam 75 and tie bar 80. Near the bend a suitable support for the shaft 85 is provided, which, as shown, comprises an ear 88, struck downwardly and rearwardly from the metal of the plate 70. The rearwardly extending free end 87 of the steering shaft loosely enters an opening or slot in a downwardly bent ear portion 89 of the tie bar, the looseness being sufficient so that the arm will not bind in the opening or slot. This is similar to the arrangement of my Patent 1,764,730, issued June 17, 1930, to which reference is directed for further details.

A suitable bumper 90 is secured to the forward portion of the hood member H', the preferred mounting being illustrated in the sectional detail of Fig. 10. Each bent end portion of each strut member 73' has two holes, one receiving a suitable fastener 91 to secure the strut member to the hood and the other receiving another fastener 92 for whatever bracket arrangement, 93, e. g., is provided for the bumper. Both fasteners, bolts e. g., pass through suitable holes in the hood member H', so that the bracket members are clamped thereto when the assembly is completed.

The pedal drive arrangement is also carried on the plate 70, and this, as shown, includes a U-shaped bracket 94, the closed portion 94' of which supports spaced hangers 95 for the pedal arms 97; the bracket 94 being secured to the plate as shown in Figs. 10, 11 and 13, by outwardly formed flange effects 96. The hangers 95 are also preferably U-shaped, with base portions secured rigidly to the bracket 94 and having aligned apertures for pivotally supporting the bent upper ends 97' of the pedal arms.

The pedal arms may carry conventional pedal sleeves 98 or pads (not shown) on their outwardly bent lower ends 97'', to which, inwardly from the sleeves e. g., the forward ends of the axle operating links 63 are secured in a manner obvious from Figs. 10 and 11. Provision for suitable adjustment (not shown) may be incorporated in the links 63, so as to change the effective average distance from the seat to the pedals.

It will be noted that most of the pedal drive and steering gear apparatus and also the bracket 73 may be mounted on the plate 70, as a convenient sub-assembly, and that, when the plate is secured, this apparatus is fully and effectively mounted. Such sub-assembly would not, of course, include the steering shaft or bumper parts 90, 93, and probably not the pedal linkage 63, 97.

I claim:

1. In a juvenile vehicle of the type which a child rides, a pair of sheet metal body side members having front and rear wheel shrouding fender portions outstruck therefrom and inwardly turned upper marginal flanges, sheet metal front and rear deck panels and means rigidly securing the side marginal edges thereof to said flanges at the forward and rearward portions of the body respectively, and a sheet metal load receptacle rigidly secured to one of said deck panels and to both side members at the inturned flanges thereof.

2. A body for a juvenile vehicle of the type which a child rides, comprising a pair of sheet metal outer side body members each having an inwardly turned flange at the upper edge thereof, and each having outwardly bulged portions at the front and rear strengthening the same and adapted to serve as wheel fenders, a load receiving receptacle disposed between said members and having upright side and end walls and outwardly turned flanges extending continuously thereabout at the upper margins of said walls, the said receptacle wall flanges lying in face to face relationship to the side member flanges and secured rigidly thereto, and top panel means bridging and connecting the side members forwardly and rearwardly of the receptacle, said means being rigidly connected to the forward and rearward flanges respectively of the receptacle and to the inturned flanges of the sides.

3. In a juvenile wheeled vehicle of the type having front steering wheels, a sheet metal body having side walls with outwardly bulged portions adapted to shroud such wheels, and a transverse substantially upright plate connected to the outwardly bulged portions and adapted to support the steering mechanism for the wheels.

4. In a juvenile vehicle of the class having front and rear sets of wheels, a sheet metal body having depending side portions with semi-domoidal fender effects adapted to laterally shroud portions of the wheels of both sets, and a support for one set comprising a plate connecting the side portions and rigidly secured to oppositely disposed fender effects inside thereof.

5. In a juvenile wheeled vehicle of the type having front steering wheels, a sheet metal body having depending side portions and a front portion adapted to lie outwardly from such steering wheels and at least partially shroud the same, a transverse upright plate connecting the side portions and secured thereto, and strut means connecting the lower portion of the plate to the front portion of the body, said plate being adapted to support steering mechanism for operative association with the steering wheels.

HERMAN L. KRAEFT.